United States Patent [19]

Fukumoto et al.

[11] Patent Number: 5,047,800
[45] Date of Patent: Sep. 10, 1991

[54] IMAGE RECORDING APPARATUS

[75] Inventors: Fumio Fukumoto, Yamato; Osami Kato, Ebina; Hideaki Hirasawa, Sagamihara; Tsutomu Tsukamoto, Machida, all of Japan

[73] Assignee: Minolta Camera Kabushiki Kaisha, Osaka, Japan

[21] Appl. No.: 581,686

[22] Filed: Sep. 13, 1990

[30] Foreign Application Priority Data

Sep. 14, 1989 [JP] Japan .................................. 1-236891
Dec. 6, 1989 [JP] Japan .................................. 1-315199

[51] Int. Cl.[5] .............................................. G03B 13/28
[52] U.S. Cl. ....................................... 355/45; 355/44
[58] Field of Search ..................................... 355/44, 45

[56] References Cited

U.S. PATENT DOCUMENTS 4,695,155 9/1987 Ishii et al. ............................... 355/45
4,755,855 7/1988 Watanabe .
4,931,828 6/1990 Fujita et al. ............................ 355/45

FOREIGN PATENT DOCUMENTS 63-316071 12/1988 Japan .

Primary Examiner—Monroe H. Hayes
Attorney, Agent, or Firm—Joseph W. Price

[57] ABSTRACT

An image recording apparatus for recording an image on a record sheet by projecting the image onto an image recorder through a projection lens includes an image position detecting device for detecting position of the image to be projected on the image recorder and a reflecting mirror for correction of the image position for shifting an optical axis of light incident on the image recorder in the direction orthogonal to the direction of feeding a recording material. A shift of the reflecting mirror for correction of the image position and a time to feed the recording material to the image recorder are controlled in response to the result of detection by the image position detecting device. This makes it possible to control a position where the image is to be formed in both the recording material feeding direction and the orthogonal direction thereto.

19 Claims, 17 Drawing Sheets

FIG.17
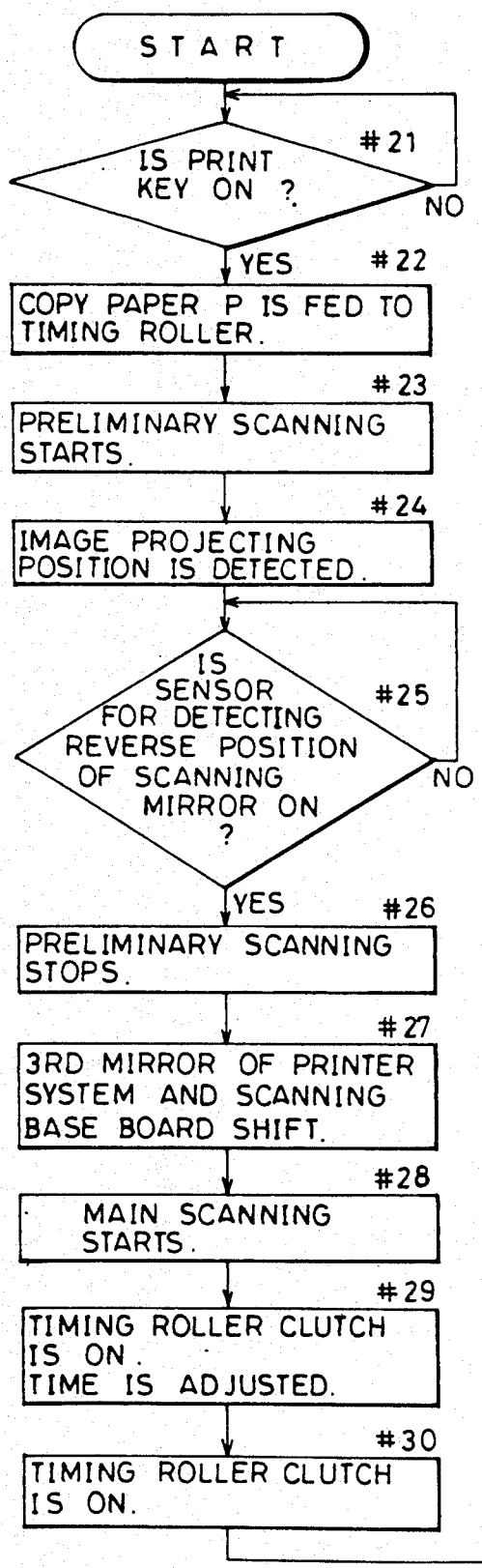
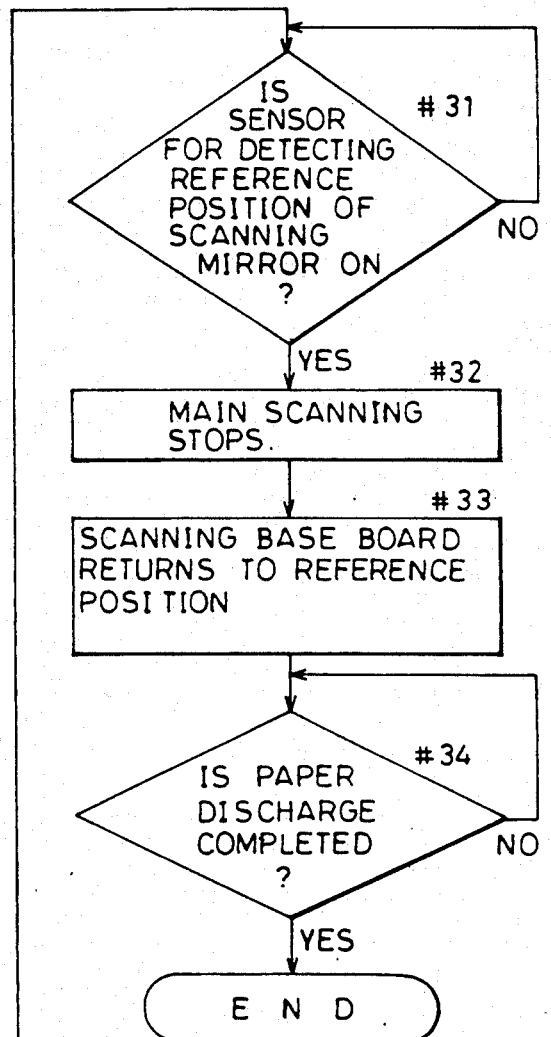

IMAGE RECORDING APPARATUS

BACKGROUND OF THE INVENTION

1. Field of the Invention

The present invention relates generally to image recording apparatuses and, more particularly, to an image recording apparatus in which even if position of an image of a microfilm or the like to be projected shifts vertically and horizontally from a normal position of the image to be projected upon copying operation, the image can be recorded in the center of copy paper.

2. Description of the Related Art

A conventional microfilm reader/printer has a screen projection mechanism and a printing mechanism such as of an electrophotographic system and is capable of printing on copy paper a microfilm image projected on a screen. In the conventional microfilm reader/printer, however, a position of an image projected on the screen need be adjusted to a predetermined position while moving the microfilm vertically and horizontally so that the image may not be shifted to one side of the copy paper, or part of the paper may not be cut out in printing. In order to facilitate this adjustment, as shown in FIG. 1A, marks (guides) M indicating corners of an outline of an image are provided on a screen S so that the outline of image I to be projected fits in the guides. This fitting enables an image IP to be printed in the center of copy paper P as shown in FIG. 1B. FIGS. 1C-1F show a state that the image is printed with its position deviated from the normal position set by the guides.

In a reader/printer having an automatic retrieval function, however, a position of blip marks for retrieval provided on the microfilm and a position of an image are not definite, and there is a deviation for each frame. Thus, it has been required to adjust the positions thereof for each image when reading the blip marks to stop the film.

For recording an image on the microfilm, there are two modes: a comic mode in which an image is recorded in an erect state as shown in FIG. 2A and a cinematic mode in which an image is recorded rotating 90° as shown in FIG. 2B. When these two kinds of films are projected on the screen, the image should always be made in the erect state, so that the image recorded in the cinematic mode is rotated 90° by a prism to be projected. Further, when the image on the film is recorded with an inclination as shown in FIG. 2C, it is also possible to correct the inclination by employing a prism. However, when a projected image is rotated by employing a prism or the like, the image is deviated vertically and horizontally due to a slight deviation of an optical axis which results from difficulties in strictly matching an optical axis of a projection lens and that of a prism for rotating the image (see FIGS. 1D and 1F). Accordingly, the adjustment of image position is also required.

As a countermeasure to the foregoing problems, it has been considered that the deviation of the position of the image to be projected is automatically corrected. Such apparatuses and methods have been proposed as follows: an apparatus and a method for controlling a timing at which copy paper is fed so as to correct a deviation X (see FIG. 1C) in the direction of copy paper feeding (Japanese Patent Laying-Open No. 63-316071), and an apparatus and a method for controlling a timing at which copy paper is fed so as to correct deviation X in the direction of copy paper feeding and moving a projection lens so as to correct a deviation Y (see FIG. 1E) perpendicular to deviation X (Japanese Patent Laying-Open No. 61-275774).

In the above-described correction in image position, according to the former method, the correction in image position is available in the copy paper feeding direction but not in the direction perpendicular to the copy paper feeding direction. According to the latter method, since a shift of the projection lens varies depending on a magnification set in the projection lens, the shift need be controlled depending on a detected magnification of the projection lens. Since the shift is very small, a precise control mechanism is required. When the directions of longer sides and shorter sides of the image on the microfilm are deviated by 90° from those of longer and shorter sides of copy paper, the image need be rotated by 90° and hence requires employment of the prism for image rotation; however, when the image is rotated by employing the image rotating prism, a projected image deviates vertically and horizontally even if the optical axis of the projection lens slightly deviates from that of the image rotating prism. Therefore, the similar positional correction is necessary in image rotation according to the latter method.

SUMMARY OF THE INVENTION

One object of the present invention is therefore to form an image to be recorded at a desired position on a recording medium in an image recording apparatus.

Another object of the present invention is to facilitate correction of position of an image to be recorded in an image recording apparatus.

A further object of the present invention is to correct position of an image by a device having a simple structure in an image recording apparatus.

A still further object of the present invention is to provide an image forming method which facilitates correction of position of an image to be reproduced in an image recording apparatus for projecting an image recorded on an original to reproduce the recorded image on a recording medium.

The foregoing object of the present invention can be accomplished by an image recording apparatus including the following elements. More specifically, an image recording apparatus according to the present invention includes an image forming device for reproducing an image on an original onto a recording medium; a transporting device for transporting the recording medium to the image forming device at a predetermined timing; a projecting device for projecting the image on the original onto the image forming device; a detecting device for detecting a position of an image to be projected onto the image forming device; a shifting device for shifting an optical axis of the image to be projected in a direction orthogonal to the direction of transporting the recording medium; and a controller for operating the shifting device in response to a result of detection by the detecting device so that the image may be formed at a predetermined position on the recording medium and controlling the transporting device so as to alter a timing to transport the recording medium.

The position of the image to be projected onto the image forming device is detected. The shifting device is then operated in response to the result of the detection of image position so that the image may be formed on the predetermined position on the recording medium, and the transport timing of the recording medium is altered. Accordingly, the image position is shifted by the shifting device with respect to the direction orthogonal to the direction of transporting the recording medium, while the transporting device is controlled to alter the transport timing of the recording medium with respect to the direction of transporting the recording medium. Consequently, the image can be formed at a desired position on the recording medium in the image recording apparatus.

Preferably, the shifting device having two parallel reflecting planes or refracting planes rotates, whereby an optical axis of an image is shifted. The position of the image in the direction of transporting the recording medium and in the direction orthogonal to the transporting direction is controlled only when the shifting device having the two parallel reflecting planes or refracting planes rotates. Consequently, correction of image position can be performed by a device having a simple structure in the image recording apparatus.

According to another aspect of the present invention, in the image recording apparatus for projecting the image recorded on the original to reproduce the recorded image on the recording medium, image formation is carried out in the following steps; that is, an image forming method in accordance with the present invention includes the steps of: detecting which position on the recording medium the image is to be reproduced; evaluating a deviation of the image in a first direction with respect to a predetermined position on the recording medium and a deviation of the image in a second direction different from the first direction in response to a result of the detection of the image position; and shifting a position of the image to be projected so that the image on the original may be reproduced at a predetermined position on the recording medium.

The deviations of the image in the first direction and in the second direction different from the first direction with respect to the predetermined position on the recording medium on which the image is to be formed, are evaluated, and in response to the result of the evaluation of the deviations, the position of the image to be projected is shifted. This makes it possible to provide the image forming method which facilitates the correction of image position in the image recording apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12-17 are diagrams for explaining a third embodiment of the present invention.

DESCRIPTION OF THE PREFERRED EMBODIMENTS

Figure 3:
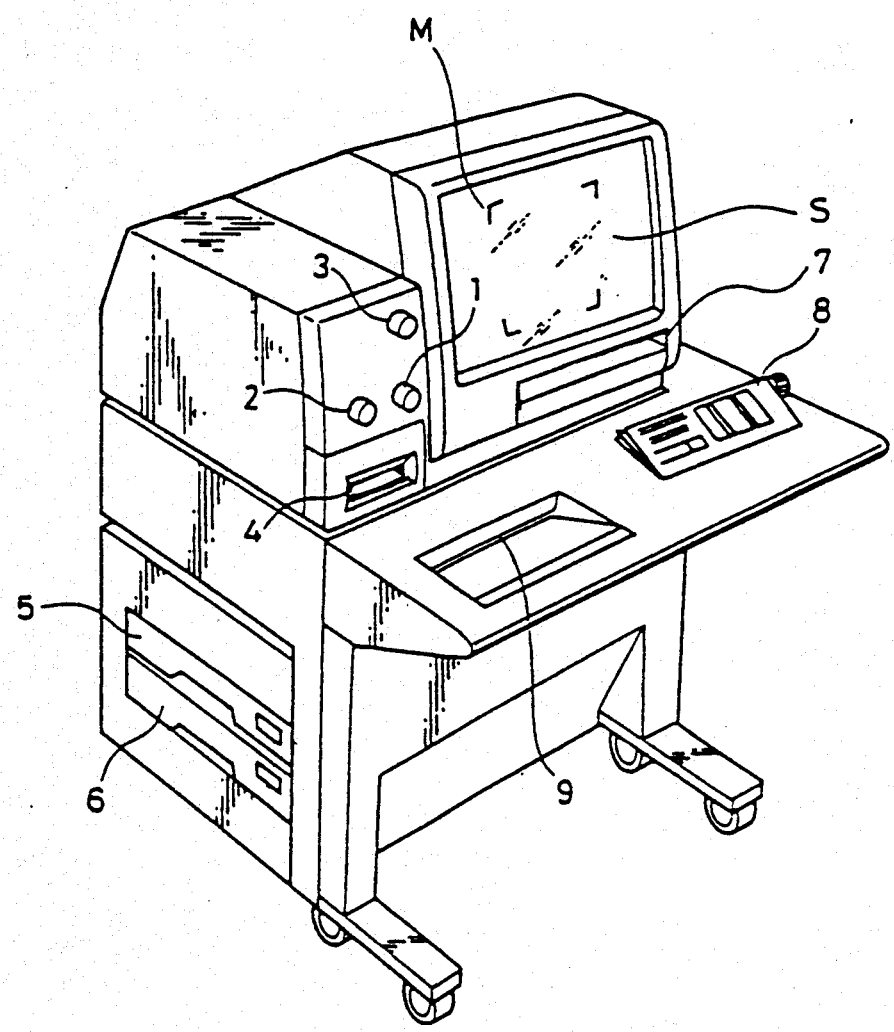
FIG. 3 is a perspective view showing the exterior of a reader/printer to which the present invention is applied.

The embodiments of the present invention will now be described. FIG. 3 is a perspective view showing the exterior of a reader/printer to which the present invention is applied. The reader/printer comprises a screen S for enlarging and projecting an image on a microfilm, a zoom lens driving knob 1 for setting magnification of a built-in projection zoom lens, a prism rotating knob 2 for setting the angle of rotation of a prism for setting a projected image in a desired direction, a focusing knob 3 for bringing the projected image into focus, a cartridge inlet port 4 through which a roll film cartridge is inserted, paper cassettes 5 and 6 for accommodating copy paper, an indicator 7 for indicating copying modes (the size of copy paper, the number of sheets to be copied, etc.) set in the reader/printer and indicating the state of the apparatus (paper jam, the presence/absence of copy paper on the paper cassettes, etc.), a controller 8 for setting the copying modes in the apparatus and instructing a printing and an automatic retrieval of frames of a microfilm image, and a paper discharge port 9 through which the image-recorded copy paper is discharged.

When an operator inserts a cartridge accommodating a rolled microfilm, on which a number of images are recorded, into cartridge inlet port 4, and then inputs a frame number or the like of a desired image from controller 8, the film is transported and the image of a desired frame number stops at around a predetermined position and then enlarged and projected on screen S by an optical mechanism which will be described later. The operator rotates the direction of the image by operating prism rotating knob 2, if necessary, or alternatively, brings the projected image into focus by operating focusing knob 3. In addition, pressing a print key on controller 8 causes the image enlarged and projected on screen S to be recorded on the copy paper accommodated in paper cassette 5 or 6 by image recording means of the well known electrophotographic system, which will be described later, and then discharged through paper discharge port 9.

(1) First embodiment

Figure 1A:
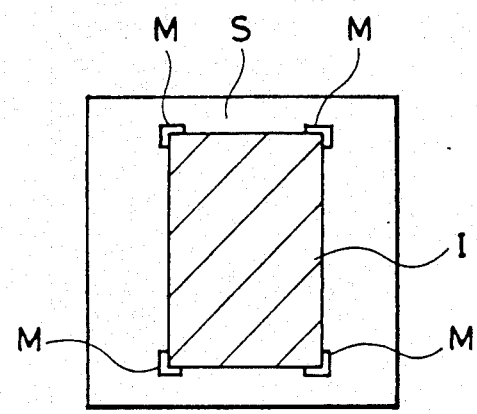
FIGS. 1A-1F are diagrams for explaining the relation between a deviation in position of an image projected on a screen and a print.
Figure 1B:
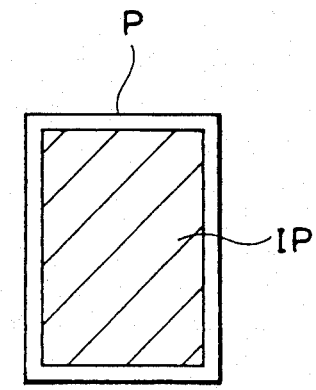
Figure 1C:
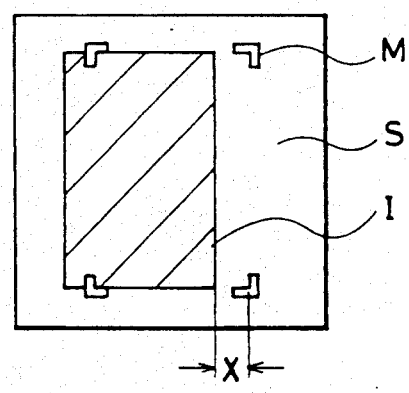
Figure 1D:
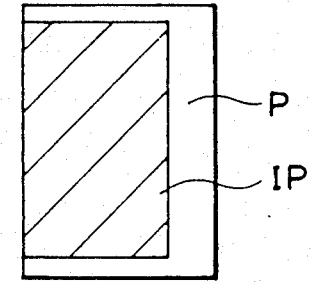
Figure 4:
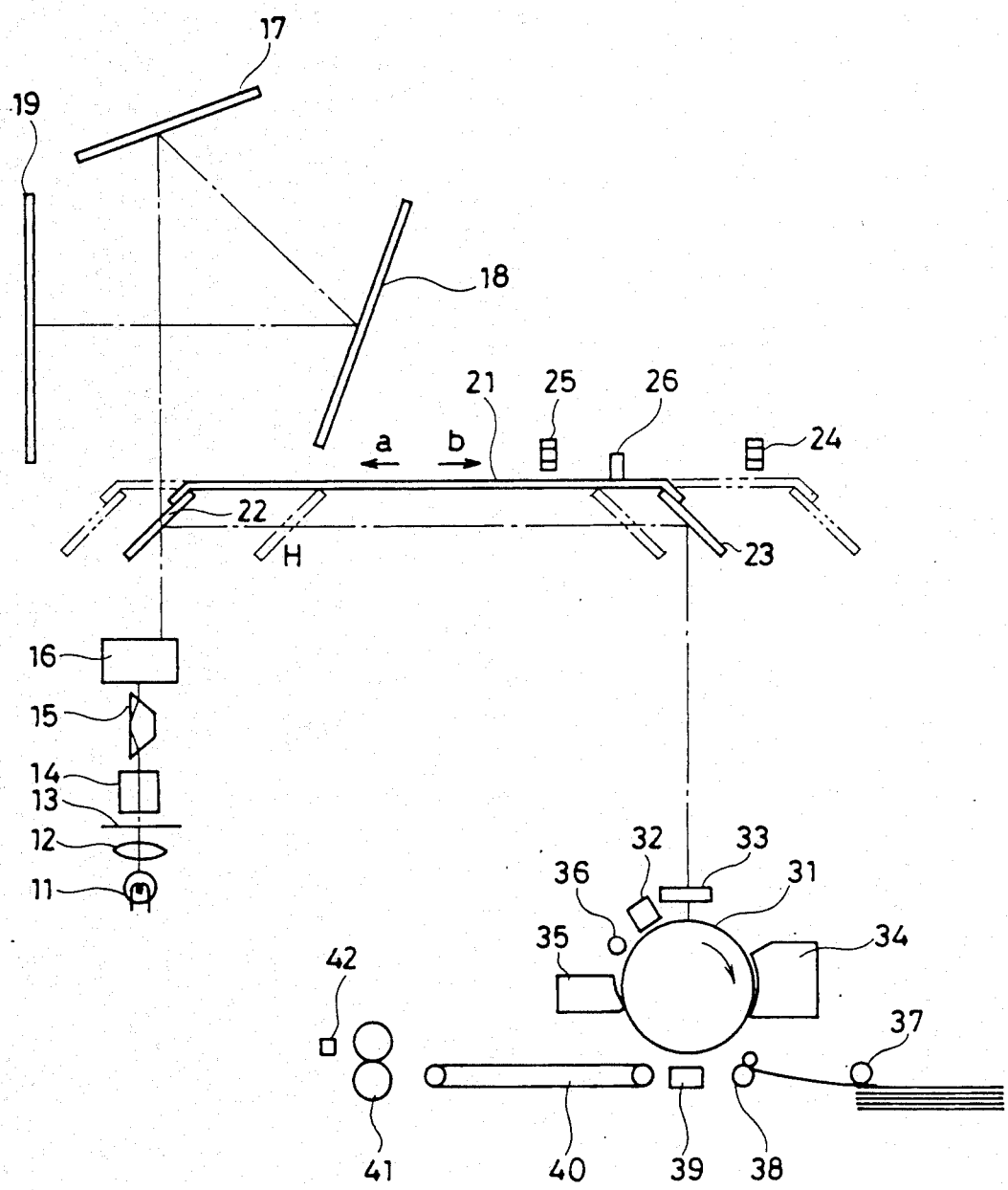
FIG. 4 is a diagram showing a principal portion of a reader/printer according to a first embodiment of the present invention.

FIG. 4 shows major portion of a first embodiment of a microfilm reader/printer in which the present invention is implemented. The microfilm reader/printer comprises a light source lamp 11, a condenser lens 12, a microfilm 13, a projection lens 14 having a variable-scale magnification mechanism, an image rotating prism 15 for rotating the direction of an image to be projected, an optical element 16 for shifting an optical axis, reflecting mirrors 17 and 18 for forming an optical path of a reader system, and a screen 19. Guides M are provided on the screen to set position and magnification of an image to be projected, as shown in FIG. 1A.

Scanning mirrors 22 and 23 are mounted at the opposite ends of a scanning mirror supporter 21 and are shifted in the opposite directions of arrows a and b by a driving mechanism not shown while scanning. A sensor 24 for detecting a reference position of the scanning mirrors and a sensor 25 for detecting a position where the shifting direction of the scanning mirrors is reversed (hereinafter referred to as a reversing position) are provided to detect a position of the scanning mirror supporter. A photo-interrupter is employed in this embodiment and fixed on a frame of an apparatus not shown. A sensor driving element 26 fixed on scanning mirror supporter 21 serves as a light intercepting plate in this embodiment. Interception of light transmitted between light emitting portions and light receiving portions of sensors 24 and 25 formed of the photo-interrupter detects whether the scanning mirrors are at a reference position or at a reversing position.

The microfilm reader/printer further comprises a photoreceptor drum 31, a corona charger 32, a slit plate 33 for exposure, a developing device 34, a cleaner 35, an eraser 36, a paper feeding roller 37, a timing roller 38, a transfer/separation charger 39, a transport belt 40, a fixing roller 41 and a paper discharge sensor 42. An outline of a structure relating to image formation will be described later in a third embodiment. An image position detecting sensor 33b is provided on exposure slit plate 33 to detect position of an image to be projected on photoreceptor drum 31. This will now be described with reference to FIG. 5.

Exposure slit plate 33 is provided close to photoreceptor drum 31 to slit-expose on photoreceptor drum 31 a microfilm image enlarged by projection lens 14. Light receiving elements P1-Pn are arranged along a side edge of a slit portion 33a and over a total length of the slit, so as to constitute image position detecting sensor 33b. It is now assumed that a microfilm image to be projected is recorded as a negative image on a transparent background. Since the image to be projected onto slit 33 changes to a negative image from the transparent background portion after the scanning mirrors starts preliminary scanning, it is possible to detect a position of the end of the image in the direction of scanning, i.e., the copy paper feeding direction (an X direction) based on a time period required for the image to change to an opaque negative image after the scanning starts. In addition, since only some of light receiving elements P1-Pn detect the change to the negative image, a determination as to position of the leading light receiving element which detects the change makes it possible to detect a position of the end of the image in the direction orthogonal to the copy paper feeding direction, i.e., and axial direction of the photoreceptor drum (a Y direction).

A description will now be given on optical element 16 for shifting an optical axis (hereinafter referred to as an optical shift element). This optical element serves to correct the end position of the image in the axial direction of the photoreceptor drum (Y direction) described above.

Figure 6A:
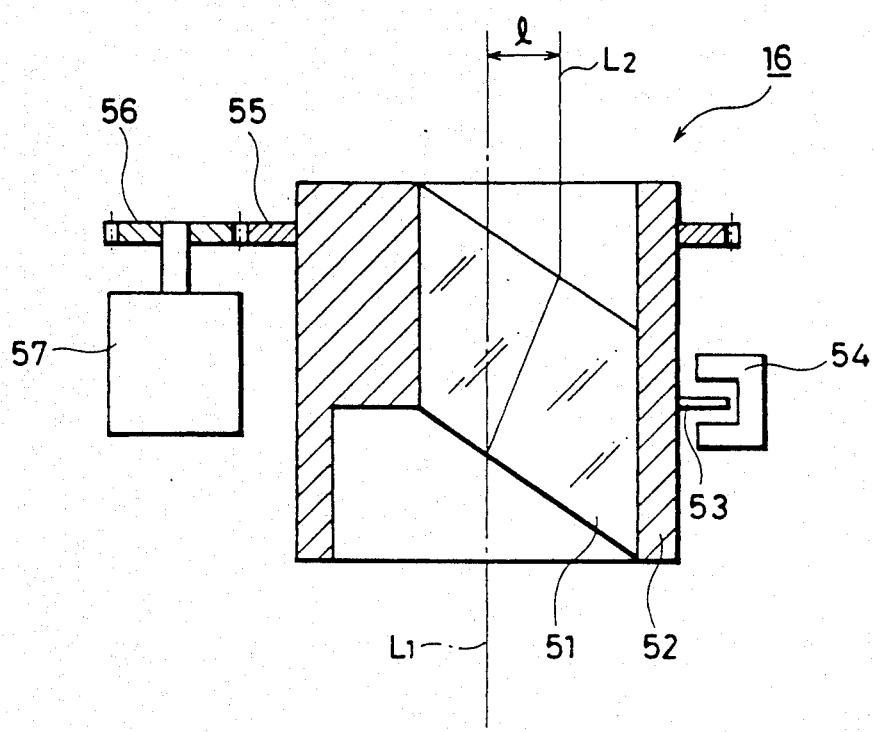
FIGS. 6A and 6B are cross-sectional views showing structure of an optical element for shifting an optical axis.
Figure 6B:
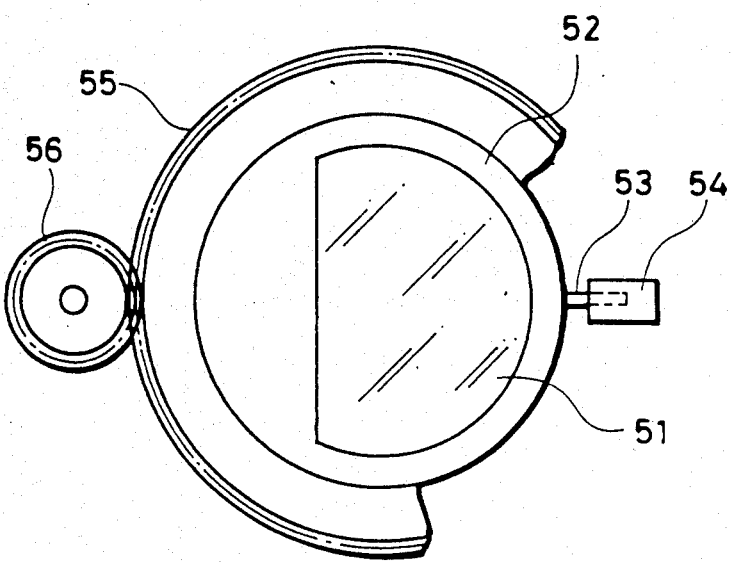
Figure 7:
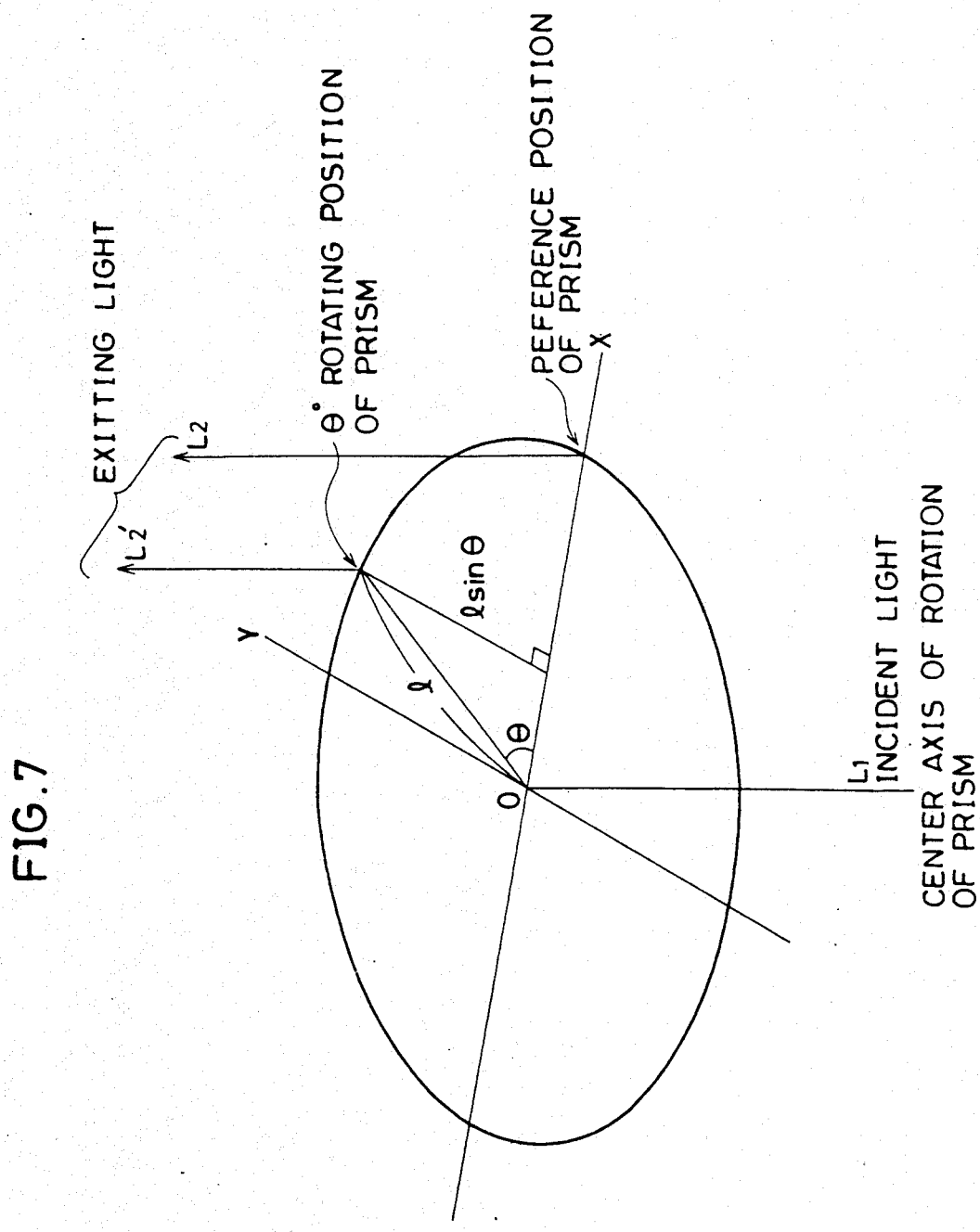
FIG. 7 is a diagram for explaining action of the optical shift element.

Reference is now made to FIGS. 6A, 6B and 7. FIG. 6A is a cross-sectional view of the optical shift element, while FIG. 6B is a plan view thereof. Referring to these figures, optical shift element 16 comprises a prism 51, a cylinder 52 for accommodating and rotating the prism, a light intercepting plate 53 provided outside cylinder 52 for detecting a reference position in the rotating direction of the prism, a sensor 54 provided at a position corresponding to light intercepting plate 53 for detecting the reference position of the prism, and light emitting elements and light receiving elements. The reference position is detected by interception of an optical path by light intercepting plate 53. Optical shift element 16 further comprises a gear 55 provided at an outer circumference of cylinder 52, and a pinion 56 meshing with gear 55 and fixed on the axis of rotation of a stepping motor 57.

Prism 51 has a pair of parallel planes inclined relative to an incident-light axis $L_1$ which is a spacing l apart from an exitting-light axis $L_2$. Prism 51 is rotatable with incident-light axis $L_1$ used as an axis of rotation through stepping motor 57, pinion 56 and gear 55.

It is now assumed, as shown in FIG. 7, that a position of light incident on prism 51 is the origin, an axis parallel to the axis of rotation of photoreceptor drum 31 is a Y axis, an axis perpendicular to Y axis is an X axis, a position of exitting-light axis $L_2$ on X axis is 0, the angle of rotation of the prism, i.e., a reference position. When prism 51 rotates by an angle $\theta$, the exitting-light axis comes to the position of $L_2$. This means that the exitting-light axis shifts by $l \sin\theta$ in the direction of Y axis, that is, in the direction of the axis of rotation of the photoreceptor drum. This makes it possible to correct the deviation of the image in the direction of the axis of the photoreceptor drum (Y direction); however, this correction causes another deviation of the image by $(1-l\cos\theta)$ in the direction (X direction) perpendicular to the axial direction of rotation of the photoreceptor drum, i.e., the copy paper feeding direction. This new deviation can be eliminated when corrected at the same time when the deviation in the copy paper feeding direction is corrected.

Operation of the apparatus will now be described. It is now assumed that when the apparatus is operated, scanning mirror supporter 21 is driven by a driving mechanism not shown to be set in a reference position detected by reference position detecting sensor 24. Scanning mirrors 22 and 23 are at positions shown by a dotted line H in FIG. 4. An image on a microfilm 13 is illuminated with light source lamp 11 and then projected on screen 19 through projection lens 14, image rotating prism 15, optical shift element 16 and reflecting mirrors 17 and 18. The operator, if necessary, rotates image rotating prism 15 in accordance with the direction of the image on the film so that the image on the film may become an erect image on the screen.

When a print key 77 on an operation panel not shown is turned on, scanning mirror supporter 21 shifts in the direction of the arrow a to perform preliminary scanning, so that the microfilm image is projected onto exposure slit 33. Sensor 33b formed of light receiving elements P1-Pn on slit 33 detects an image position in the scanning direction (X direction) of the image to be projected and that in the direction of rotation axis of the photoreceptor drum (Y direction) orthogonal to X direction, so as to store the detected image positions into a memory of a control device which will be described later. When sensor 25 detects that scanning mirror supporter 21 reaches a termination of the scanning, supporter 21 stops. Optical shift element 16 is rotated dependently on the deviation between the end position of the image in the direction of the rotation axis of photoreceptor drum 31 detected by light receiving elements P1-Pn and a normal end position of the image to be projected upon copying operation, so that the position thereof is corrected. Supporter 21 performs main scanning in the direction of the arrow b to form a latent image on photoreceptor drum 31. The latent image is developed by developing device 34, and the developed toner image is then transferred onto copy paper to be fixed and discharged; however, at the same time, the copy paper feeding timing is controlled, so that corrections are made on the deviation between the end position of the image in the scanning direction detected by light receiving elements P1-Pn and the normal end position to be projected upon copying operation, together with another deviation of the image which have newly occurred in the scanning direction due to rotation of optical shift element 16.

Reference position detecting sensor 24 detects the termination of the main scanning, so as to stop the scanning operation by the scanning mirror and then return the optical shift element to the reference position, thereby completing printing operation.

Figure 8:
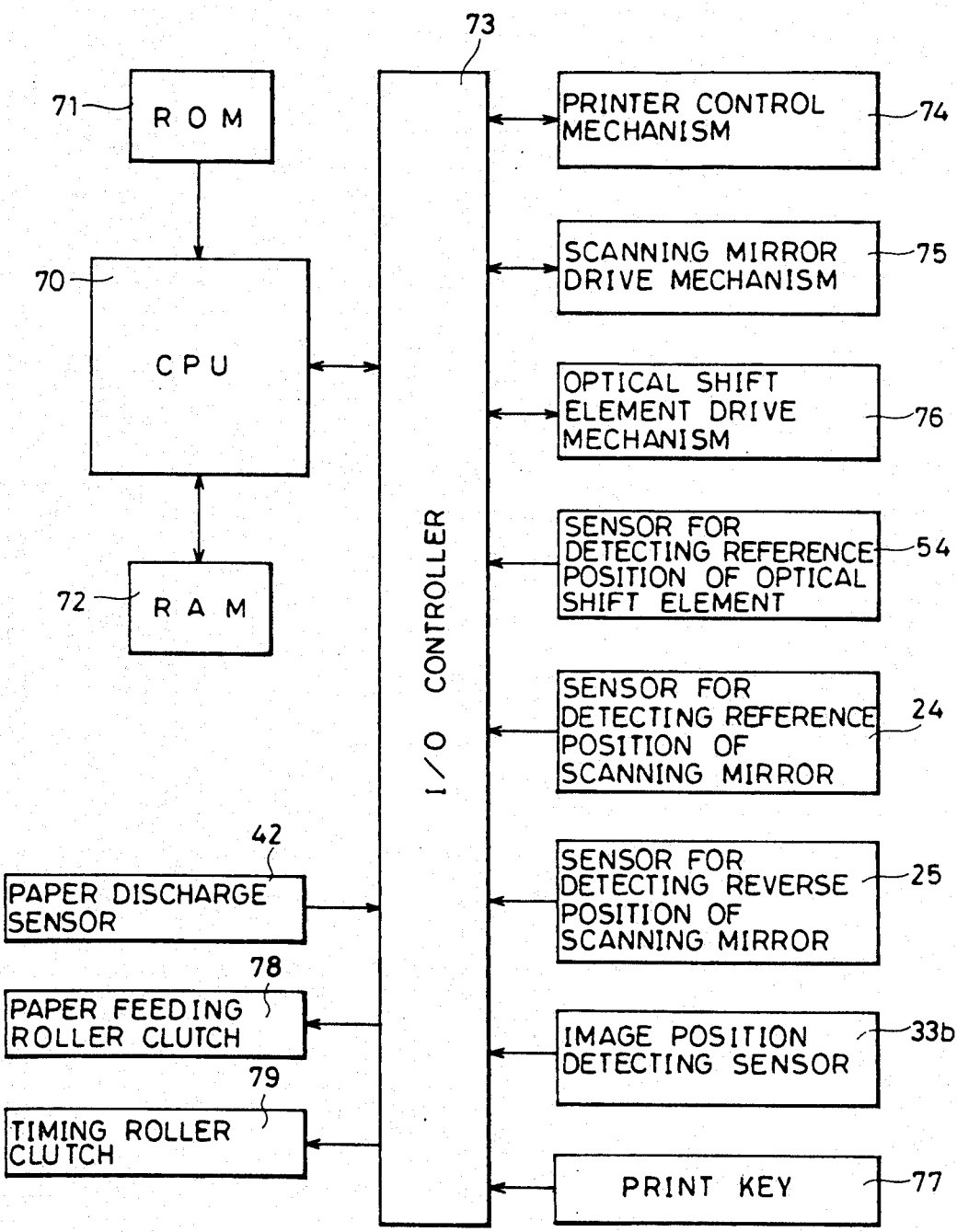
FIG. 8 is a block diagram of a control circuit.

FIG. 8 is a block diagram of a control circuit of the microfilm reader/printer, showing portions relating to the present invention. The control circuit comprises a CPU 70, an ROM 71 and RAM 72 connected to CPU 70, a printer controlling mechanism 74 connected through an I/0 controller 73, a scanning mirror controlling mechanism 75, an optical shift element controlling mechanism 76, a sensor 54 for detecting a reference position of the optical shift element, a sensor 24 for detecting a reference position of the scanning mirrors, a sensor 25 for detecting a reversing position of the scanning mirrors, a sensor 33b for detecting position of an image, a print key 77, a paper discharge sensor 42, a paper feeding roller clutch 78, and a timing roller clutch 79.

Printer controlling mechanism 74 includes an image processing mechanism of the electrophotographic system in which a latent image of a microfilm image projected on photoreceptor drum 31 is subjected to a toner development and then recorded on copy paper. Scanning mirror driving mechanism 75 drives scanning mirror supporter 21 to cause scanning mirrors 22 and 23 to perform preliminary scanning and main scanning. Optical shift element driving mechanism 54 rotates and drives optical shift element 16 by an angle corresponding to a deviation of an image. Print key 77 serves as a switch provided in controller shown in FIG. 3 for instructing printing of a microfilm image. Paper feeding roller clutch 78 drives or stops paper feeding roller 37 which feeds copy paper from paper feeding cassettes 5 and 6. Timing roller clutch 79 controls driving of timing roller 38 which controls a timing to feed copy paper to a transfer position.

Figure 9:
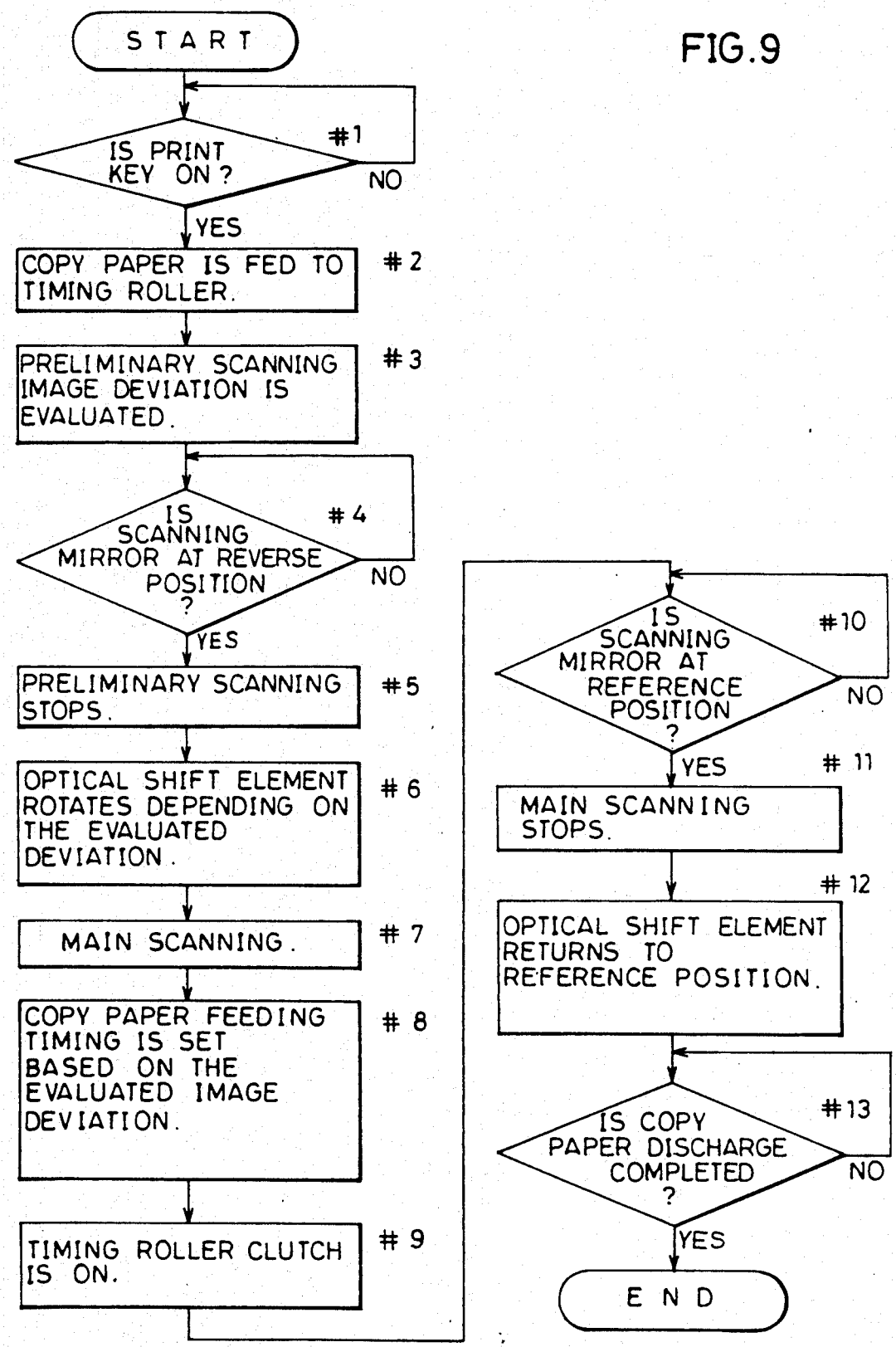
FIG. 9 is a flow chart for explaining control operation.

FIG. 9 is a flow chart for explaining control operation in printing to be executed by CPU 70 of the control circuit.

When a power supply is turned on to execute initialization, and control operation starts, a determination is first made as to whether or not the print key is ON (step #1) and then waits for the turning on of the print key. When the print key is turned on, copy paper is fed to timing roller 38 for controlling a paper feeding timing (step #2). Preliminary scanning of an image to be projected is carried out, so that sensor 33b detects position of the image. Based on the result of the detection, deviations X1, Y1 in the X and Y directions from the normal position to be projected upon copying operation are evaluated (step #3). Sensor 25 detects termination of the preliminary scanning (step #4). After waiting for the termination of the preliminary scanning, the scanning is stopped (step #5), and optical shift element 16 is then rotated by an angle $\theta 1$ corresponding to deviation Y1 of the image in the Y direction which is evaluated in advance. That is, when the deviation is Y1, the optical shift element rotates by $(\sin\theta 1 = Y1/l)$ (step #6).

Then, main scanning is executed, so that a latent image is formed on photoreceptor drum 31 and then subjected to development (step #7). Then, timing is set so that the time to operate timing roller 38 is advanced or delayed by a copy paper feeding time period corresponding to $(X1 \pm X2)$, a total value of deviation X1 of the image in the X direction which is evaluated in advance and a deviation $X2 = 1 - l\cos\theta 1$ in the X direction which occurs due to the rotation of optical shift element 16 (step #8). Thereafter, the timing roller clutch is operated (step #9). After waiting for termination of the main scanning (step #10), the main scanning is stopped (step #11). Optical shift element 16 is then returned to the reference position (step #12). Discharge of copy paper is then detected (step #13), thereby completing the operation.

(2) Second embodiment

Figure 10:
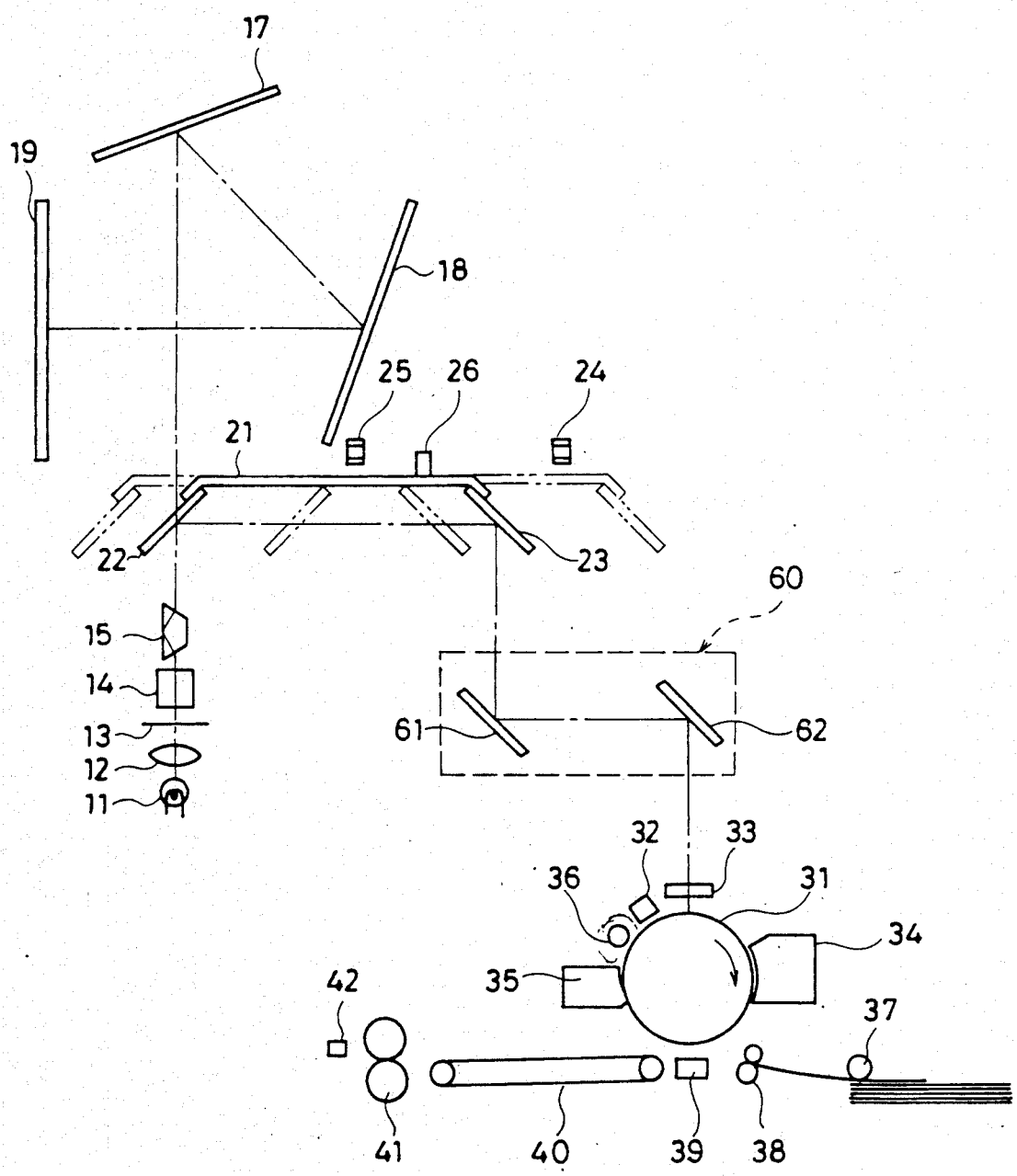
FIG. 10 is a diagram for explaining structure of a microfilm reader/printer according to a second embodiment of the present invention.

FIGS. 9 and 10 show a second embodiment of the present invention. This embodiment is different from the first embodiment in position where the optical shift element is inserted and in structure thereof. In the second embodiment, the distance between two mirrors 61 and 62 can easily be set longer. If this distance is set longer, the above described deviation Y2 resulting from the rotation of the optical shift element is reduced to a negligible small amount, and hence correction of the deviation Y2 may be eliminated. An advantage in employment of the mirrors is that the quantity of light is not reduced as much as that in employment of a prism.

In this embodiment, an image position to be projected on the photoreceptor drum is detected by image position detecting sensor 33b formed on the side edge of the slit disposed close to the photoreceptor drum. Alternatively, for detection of image position, movable image guides may be provided on the screen. The image guides are adjusted to match an image projected on the screen, thereby to detect an image position based on the adjusted position of the image guides.

(3) Third embodiment

Figure 12:
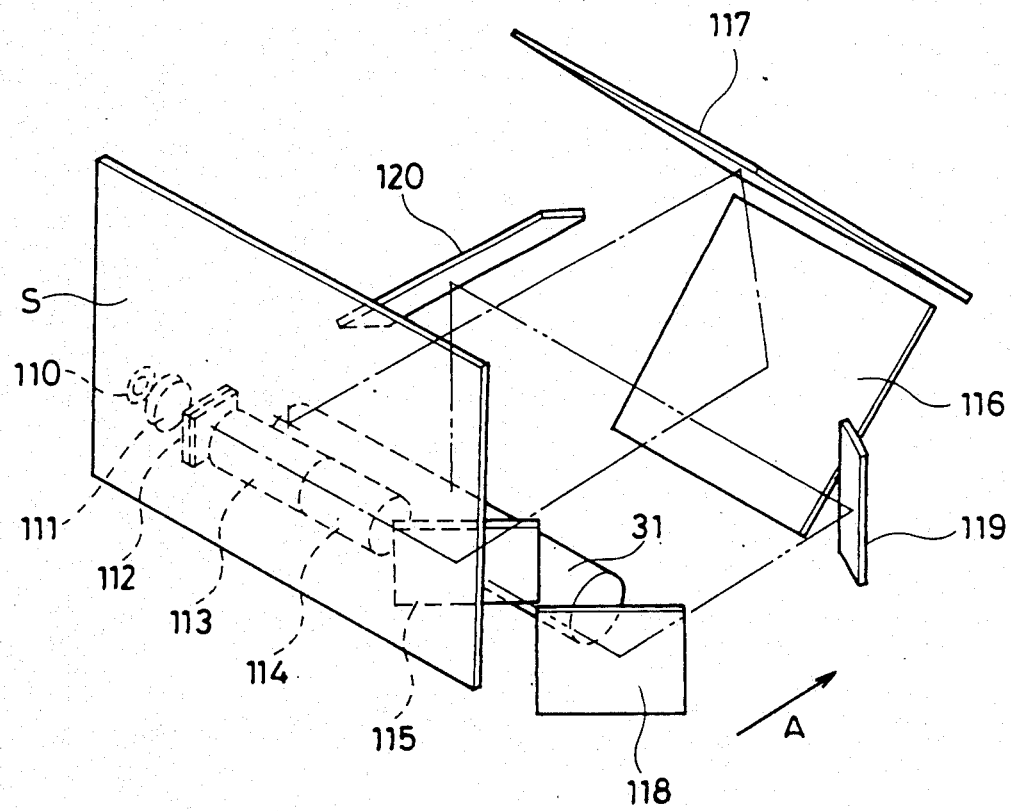

A third embodiment of the present invention will now be described. FIG. 12 is a perspective view showing a major portion of the third embodiment of the present invention and corresponds to FIGS. 4 and 10.

Referring to FIG. 12, the optical system of a reader/printer comprises a projection screen S, an illumination lamp 110, a condenser lens 111, a microfilm holder 112 formed of two transparent glass plates, a projection zoom lens 113, an image rotating prism 114 for changing the direction of an image, a first mirror 115 of a reader system, a second mirror 116 of the reader system, a third mirror 117 of the reader system, a first mirror 118 of a printer system, a second mirror 119 of the printer system, a third mirror 120 of the printer system for correcting image position projected on a photoreceptor drum, and a photoreceptor drum 31.

An outline of operation of the above-described optical system will now be described.

A desired image on the microfilm specified by controller 8 shown in FIG. 3 is located about the center of microfilm holder 112. This image is illuminated with light from illumination lamp 110, which is converged by condenser lens 111, then enlarged by projection zoom lens 113 and projected on screen S through first, second and third mirrors 115, 116 and 117 of the reader system.

When the operator instructs a printing operation, first mirror 115 keeps off the optical path. The image on the microfilm is illuminated with light from illumination lamp 110, which is converged by condenser lens 111, then enlarged by projection zoom lens 113 and formed on photoreceptor drum 31 through first, second and third mirrors 118, 119 and 120 of the printer system. The printer optical system has an image scanning mechanism of a mirror scanning system, i.e., such structure that first and second mirrors 118 and 119 of the printer system shift together to scan in the direction of an arrow A in FIG. 12, so as to project an image from its one end to the other end sequentially onto photoreceptor drum 31 in synchronization with a circumferential speed of the photoreceptor drum.

Figure 13:
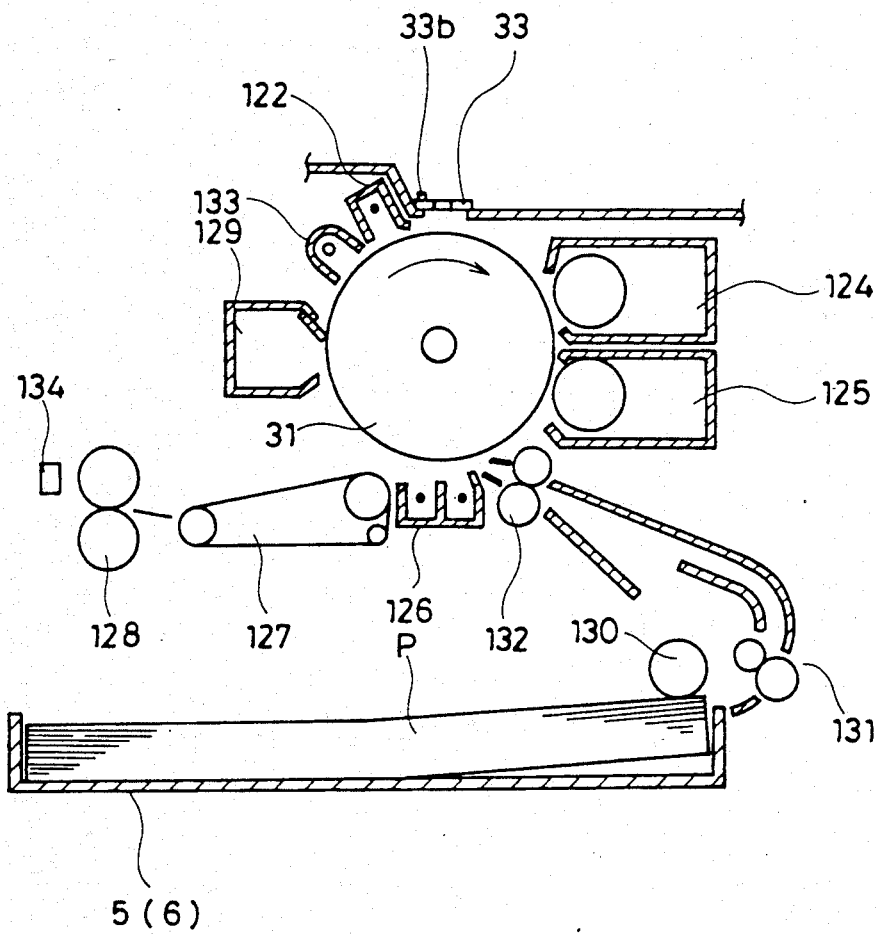

FIG. 13 is a cross-sectional view showing structure of a printer, which is fundamentally an image recording apparatus of the electrophotographic system. Referring to FIG. 13, the image recording apparatus comprises a photosensitive photoreceptor drum 31, a main charger 122 for charging the photoreceptor drum, a slit plate 123 having an opening through which projected light passes, a reversal development device 124 loaded with toner which enables development of a negative film image as a positive image, a normal development device 125 loaded with toner which enables development of a positive film image as a positive image, a transfer/separation charger 126, a transport belt 127, a fixing device 128, a cleaner 129 for removing residual toner on the photoreceptor drum, and an eraser 133 for removing residual charge. The image recording apparatus further comprises a paper cassette 5 (6) accommodating copy paper P, a paper feeding roller 130, a paper separation roller 131, a timing roller pair 132, and a paper discharge sensor 134.

The outline of operation of the printer will now be described as follows.

A microfilm image projected on photoreceptor drum 31 supplied with charges by main charger 122 is recorded as an electrostatic latent image on photoreceptor drum 31. This electrostatic latent image is developed by developing device 124 or 125 which is previously selected depending on whether the microfilm image is negative or positive. Copy paper P fed from paper cassette 5 (6) is transported to timing roller pair 132 and then to transfer/separation charger 126 at a predetermined timing, and at the same time, a toner image on photoreceptor drum 31 is transferred onto copy paper P. Copy paper P on which the toner image is transferred is transported to fixing device 128 by transport belt 127, and then discharged after the toner image is fixed. Meanwhile, photoreceptor drum 31 further rotates, and the residual toner thereon is removed by cleaner 129 and the residual charge is removed by eraser 133. Thereafter, the next image forming operation starts.

Figure 5:
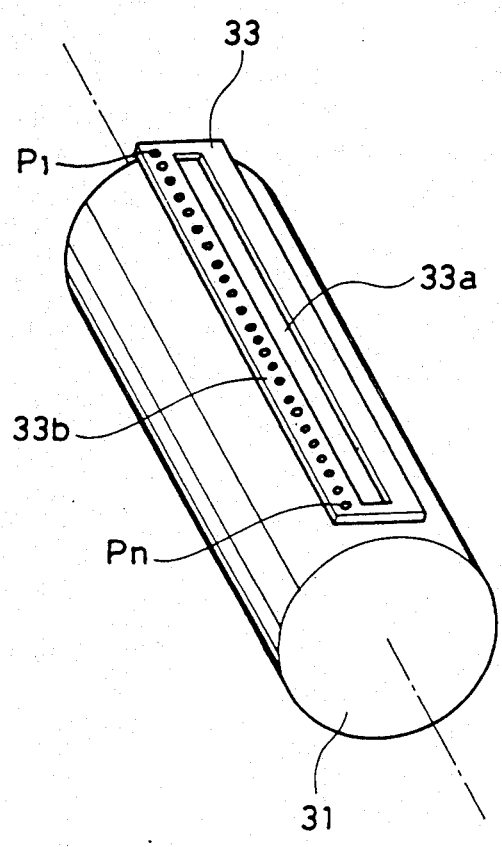
FIG. 5 is a perspective view showing arrangement of a slit plate for exposure and an image position detecting sensor.
Figure 11:
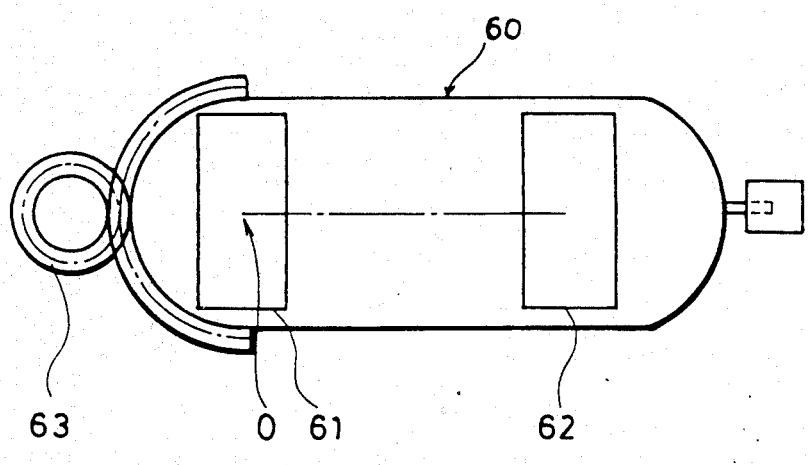
FIG. 11 is a plan view of an optical element according to the second embodiment of the present invention.

Sensor 33b for detecting position of an image to be projected, which includes a large number of light receiving elements P1-Pn arranged along the side edge of opening 33a and along the rotation axis of the photoreceptor drum, is provided on slit plate 23 of the printer, as shown in FIG. 5.

Assuming that a microfilm image to be projected is recorded as a negative image on a transparent background, since the image to be projected on slit 33 changes to a negative image from the transparent background portion after the scanning mirrors start preliminary scanning, the end position of the image in the scanning direction, i.e., the copy paper feeding direction (X direction) can be detected based as to a time period required to change the image into an opaque negative image after the scanning starts. The end position of the image in the direction perpendicular to X direction, i.e., the direction of the rotation axis of the photoreceptor drum (Y direction) can be detected based on a determination as to the position of the leading light receiving element that have detected the change to the negative image because only some of light receiving elements P1-Pn detect the change after the scanning starts.

Figure 14:
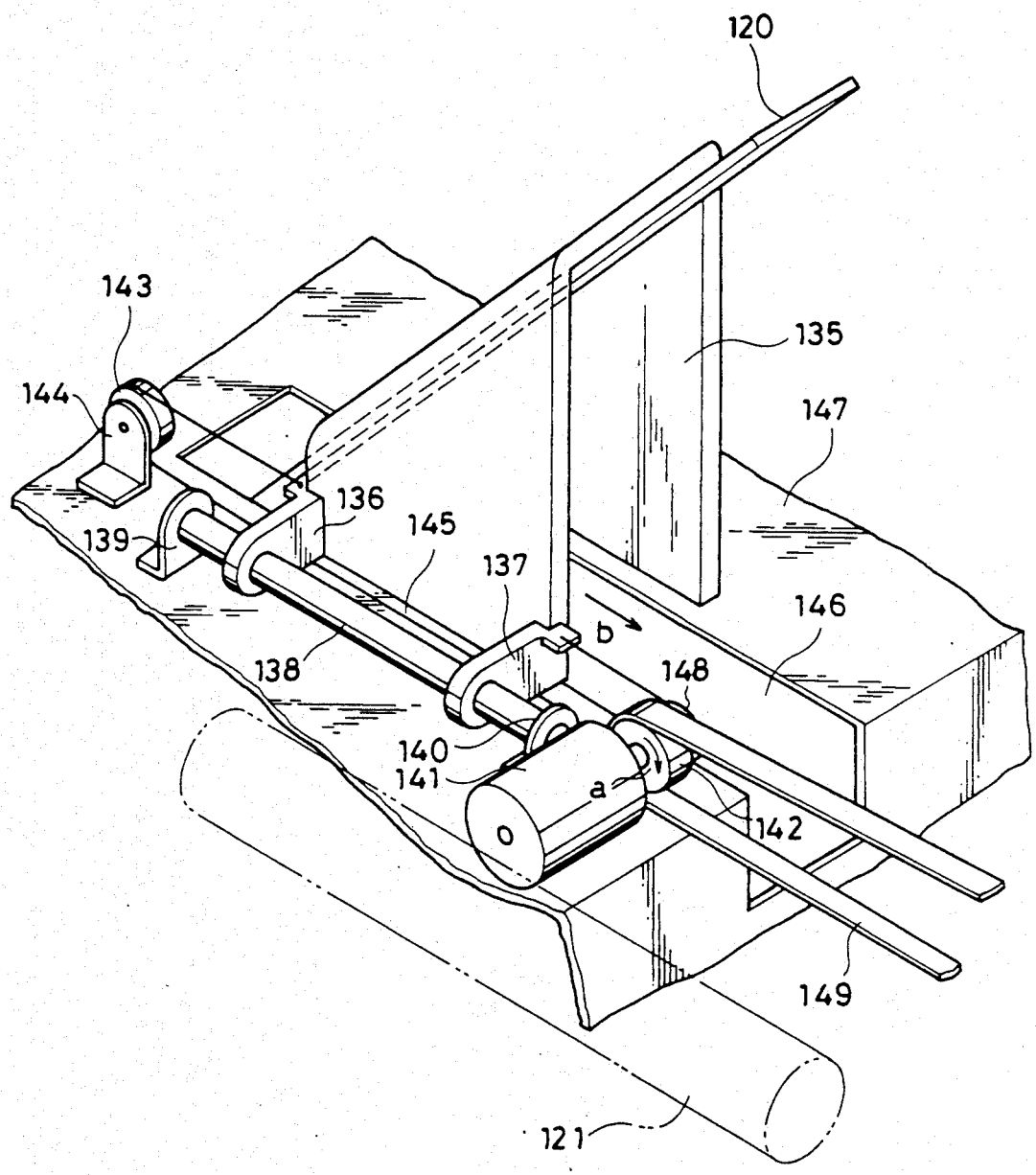

A description will now be given on specific structure of a mirror of the printer system. FIG. 14 is a perspective view showing structure of a third mirror of the printer system for correcting an image position to be projected on the photoreceptor drum. A third mirror holder 135 of the printer system serves to hold third mirror 120 of the printer system. Third mirror 120 is held inclined 45° relative to the axis of rotation of photoreceptor drum 31, with its elongated direction being along the axis of rotation of the drum. Mirror holder 135 has arms 136 and 137 slidably attached to a guide axis 138. Guide axis 138 is secured in parallel to the axis of rotation of photoreceptor drum 31 onto a main body-frame 147 by axis supporting plates 139 and 140. A pulse motor 141 is secured onto main body-frame 147 by a member not shown. A timing belt pulley 142 and a wire pulley 148 are attached to the axis of pulse motor 141. A wire pulley 143 is secured onto main body-frame 147 by a member 144. The opposite ends of a wire 145 are fixed onto arms 136 and 137 of third mirror holder 135, respectively. Wire 145 is disposed around and between wire pulleys 143 and 148. In the foregoing structure, when pulse motor 141 rotates in the direction of an arrow a, third mirror 120 is guided by guide axis 138 and moves in the direction of an arrow b in parallel to the axis of rotation of photoreceptor drum 31. Conversely, when pulse motor 141 rotates in the opposite direction to the arrow a, third mirror 120 also moves in the opposite direction to the arrow b. The shift of third mirror 120 is set to be 1 mm for each one pulse to be supplied to pulse motor 141.

Figure 15:
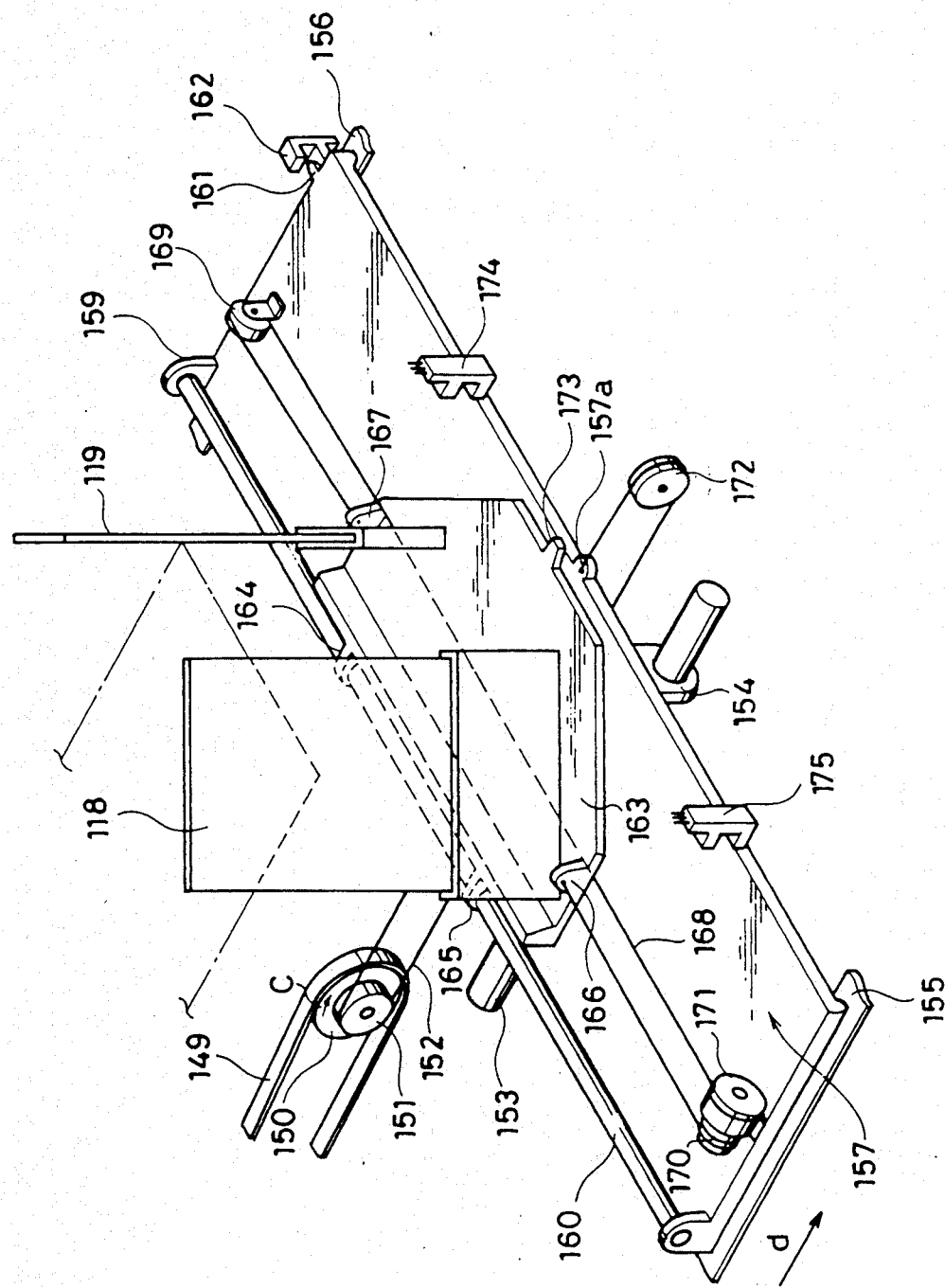

A description will now be given on a scanning mechanism including first and second mirrors 118 and 119 of the printer system with reference to a perspective view shown in FIG. 15. The scanning mechanism comprises a scanning base 57, rails 55 and 56 for supporting the scanning base, and a guide axis 153 provided parallel to guide axis 138 shown in FIG. 14. An arm 154 which fits to guide axis 153 is provided beneath scanning base 157 for making base 157 movable along guide axis 153. A timing belt pulley 150, a wire pulley 151 fixed to the same axis as that of the timing belt pulley, and a wire pulley 172 are disposed along the direction of the axis of guide axis 153. A timing belt 149 is disposed around and between timing belt pulley 150 and pulley 142 attached to the drive axis of pulse motor 141. A wire 152 is disposed around and between wire pulleys 151 and 172, with its end fixed on a fastening portion 157a of scanning base 157. When pulse motor 141 rotates in the direction of the arrow a, timing belt pulley 150 and wire pulley 151 also rotate in the direction of the arrow c, and base 157 shifts in the direction of the arrow d, that is, the same direction as that of third mirror 120. The diameter of the pulleys is set such that the shift of scanning base 157 may be half that of third mirror 120. The structure thus described aims to correct a change in length of an optical path provided when third mirror 120 is shifted, by shifting first and second mirrors 118 and 119 of the printer system in order to correct a deviation of image position projected on photoreceptor drum 31.

In order to detect a reference position of base 157 and of third mirror 120, a protrusion 161 for positional detection is provided on base 157 and a sensor 162 for detecting position of the scanning base is provided on a frame not shown.

A guide axis 160 is attached to scanning base 157 perpendicularly to guide axis 153 by supporting members 158 and 159. A scanning mirror supporting board 163 is attached slidably on scanning base 157 by members 164 and 165 fitting to guide axis 160. On scanning mirror supporting board 163, first and second mirrors 118 and 119 of the printer system are fixed at respective angles of 45° and 135° relative to the axial direction of guide axis 160 and vertically to a plane of the scanning mirror supporting board. A scan motor 171 including pulleys 169 and 170 along the axial direction of guide axis 160 is attached on scanning base 157. Wire 168, ends of which are fixed onto fastening members 166 and 167 of scanning mirror supporting board 163, is disposed around and between pulleys 169 and 170. Driving scan motor 171 shifts first and second mirrors 118 and 119 of the printer system through wire 168 and scanning mirror supporting board 163, thereby to perform scanning of the microfilm image in the direction of the axis of the photoreceptor drum 31 (Y direction).

In order to detect a scanning reference position and a reversing position of first and second mirrors 118 and 119 of the printer system constituting scanning mirrors, a protrusion 173 is provided on scannig mirror supporting board 163, and a sensor 174 for detecting the reference position of the scanning mirrors and a sensor 175 for detecting the reversing position of the scanning mirrors are provided on scanning base 157.

Figure 16:
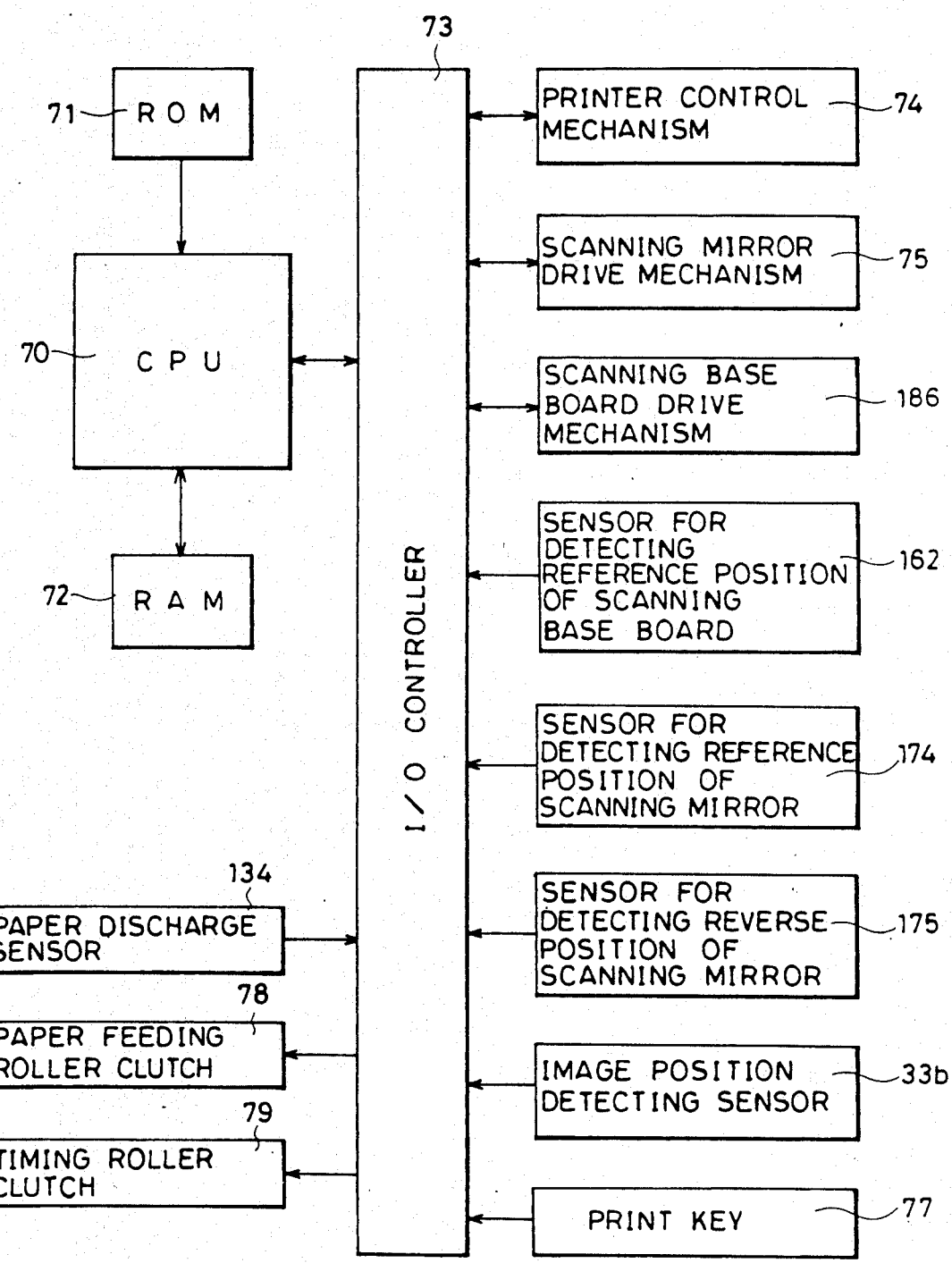

FIG. 16 is a block diagram of a control circuit of the microfilm reader/printer, corresponding to FIG. 8 shown in the first embodiment of the present invention and showing portion related to the third embodiment of the present invention. This control circuit is different from the first embodiment in that optical shift element driving mechanism 76 and sensor 54 for detecting the reference position of the optical shift element are replaced by a scanning base driving mechanism 86 and a sensor 62 for detecting a reference position of the scanning base. A description will be given on only the distinguishing points from the first embodiment.

Scanning mirror driving mechanism 75 drives scanning mirror supporting board 163, so as to perform preliminary scanning and main scanning by first and second mirrors 118 and 119 of the printer system. Scanning base driving mechanism 186 shifts the third mirror of the printer system and scanning base 157 by a distance corresponding to a deviation of an image detected by image position detecting sensor 176.

Figure 1E:
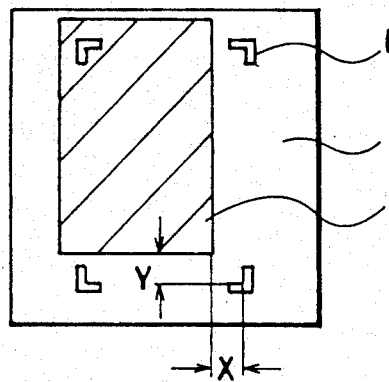
Figure 1F:
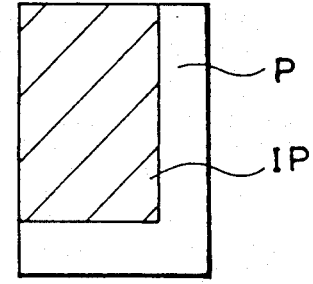
Figure 2A:
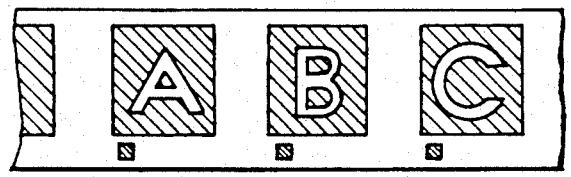
FIGS. 2A-2C are diagrams for explaining the directions of an image recorded on a microfilm.
Figure 2B:
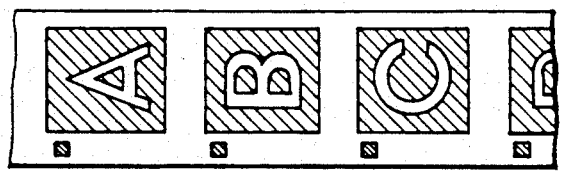
Figure 2C:
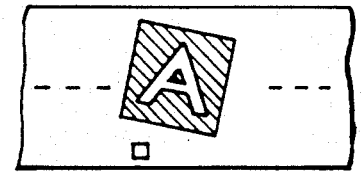

FIG. 17 is a flow chart for explaining control operation of control circuit CPU 70 upon printing. When the control operation starts, a determination is first made as to whether or not print key 77 is ON (step #21). After waiting for the print key to be turned on, CPU 70 feeds copy paper P to timing roller 132 for adjusting a paper feeding timing (step #22). Then, CPU 70 starts preliminary scanning of an image to be projected (step #23). Image position detecting sensor 33b then detects the position of the image to be projected, so that deviations X1 and Y1 in X and Y directions (see FIG. 1E) from a normal position to be projected upon copying operation are evaluated based on the result of the detection (step #24). That is, the deviation in the direction of the axis of photoreceptor drum 31 (Y direction) can be determined depending on what light receiving elements of Pl-Pn have received light. The deviation in the copy paper transporting direction (X direction) can be determined by position of scanning mirror supporting board 163 (which is represented by the number of pulses supplied to pulse motor 171) when light receiving elements Pl-Pn detect the end of the image. Termination of the preliminary scanning is detected depending on whether or not sensor 175 for detecting a reversing position of the scanning mirrors is turned on (step #25). When sensor 175 is ON, i.e., when the preliminary scanning is completed, the preliminary scanning stops (step #26). Then, CPU 70 drives pulse motor 141 through scanning base driving mechanism 186 based on the evaluated deviation of the image in Y direction and shifts third mirror 120 of the printer system and scanning base 157, so as to correct the deviation of the image in Y direction (step #27). CPU 70 then shifts scanning mirror supporting board 163 in the opposite direction to the preliminary scanning direction, to start main scanning (step #28). The timing of copy paper to be fed to timing roller 132 is adjusted by a time period corresponding to the evaluated deviation of the image in X direction with respect to a normal timing, so that the timing roller clutch is turned on (steps #29, #30). Termination of the main scanning is detected depending on whether or not sensor 174 for detecting the reference position of the scanning mirrors is turned on (step #31). When sensor 174 is ON, i.e., when the main scanning is completed, the main scanning stops (step #32). CPU 70 shifts third mirror 120 and scanning base 157, which have been shifted for correction of the deviation of image position in Y direction, in the opposite direction from the former direction and then stops the third mirror and the base in response to a detection signal of sensor 162 (step #33). After copying onto copy paper P is completed, paper discharge sensor 134 detects that paper is discharged step (#34), so that the processings are terminated.

Figure 18:
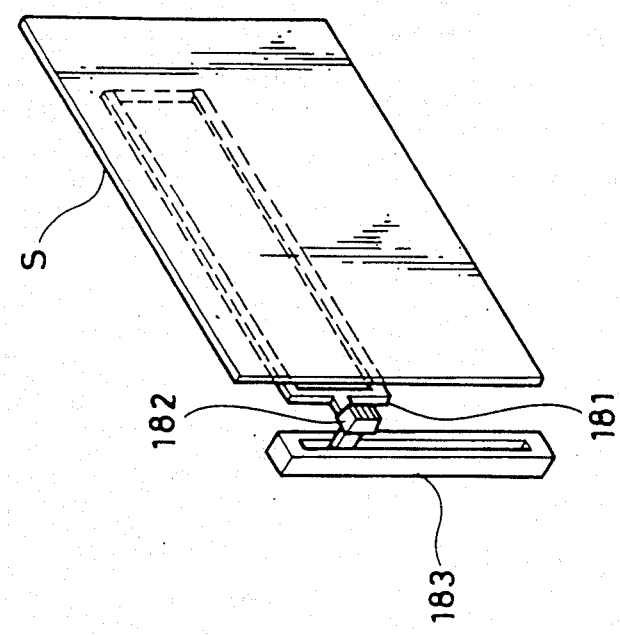

While image position detecting sensor 33b including a large number of light receiving elements Pl-Pn automatically detects the position of the microfilm image to be projected on photoreceptor drum 31 in the foregoing embodiments described heretofore, an indicator mark such as a cursor provided on screen S can substitute image position detecting sensor 33b. FIG. 18 shows one example of that substitution, in which a vertically movable cursor 181 is provided on the backside of screen S. Cursor 181 can be operated by a knob 182 externally from a frame on the side edge of the screen. The knob is connected to a slide resistor 183, so that a central position of the image is detected in accordance with a change in resistance value corresponding to position of the knob. While only a vertical position of the image projected on screen S is detected in this example, the cursor may slidably move both vertically and horizontally, to detect vertical and horizontal positions by the slide resistor so as to detect the central position of the image.

Figure 19:
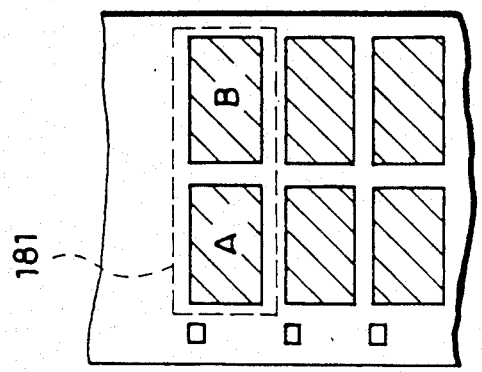
FIGS. 18 and 19 are diagrams showing another embodiment of an apparatus for detecting position of an image.

In case where one frame of a microfilm image is formed of a plurality of documents such as a check or the like as shown in FIG. 19, a cursor which encloses two documents A and B of FIG. 19, for example, may be employed. Masking is desirable in this case so that portions outside the enclosed range of the cursor may not be copied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus comprising:
    image forming means for reproducing an image on an original onto a recording medium;
    transporting means for transporting said recording medium to said image forming means at a predetermined timing;
    projecting means for projecting said image on said original onto said image forming means;
    detecting means for detecting a position of said image to be projected onto said image forming means;
    shifting means for shifting an optical axis of said image to be projected in a direction orthogonal to a transporting direction of said recording medium; and
    controlling means responsive to a result of the detection by said detecting means for operating said shifting means so that said image may be formed at a predetermined position on said recording medium and for controlling said transporting means so that a timing to transport said recording medium may be altered.

2. The image recording apparatus according to claim 1, wherein
    said shifting means has two parallel reflecting planes or refracting planes and rotates to shift the optical axis of said image.

3. The image recording apparatus according to claim 1, wherein
    said shifting means includes a movable reflecting mirror and shifts the image by moving the reflecting mirror.

4. A microfilm reader/printer comprising:
    a screen on which a mark showing the range of a predetermined size is provided and an image of a microfilm is projected;
    image forming means for reproducing said image of said microfilm onto a recording medium;
    transporting means for transporting said recording medium to said image forming means at a predetermined timing;
    projecting means having a projection lens for projecting said image of said microfilm;
    optical means having a first optical path for guiding said image projected by said projecting means to said screen, a second optical path for guiding said image projected by said projecting means to said image forming means, and switching means for switching said first and second optical paths;
    shifting means for shifting an optical axis of said image to be projected in a direction orthogonal to a transporting direction of said recording medium;
    detecting means for detecting a deviation of said projected image from said mark; and
    controlling means responsive to the result of the detection by said detecting means for operating said shifting means so that said image may be formed at a predetermined position on said recording medium and for controlling said transporting means so that a timing to transport said recording medium may be altered.

5. The microfilm reader/printer according to claim 4, wherein
    said image forming means includes a photoreceptor drum on which said image is projected, thereby forming an image, and
    said shifting means includes a movable reflecting mirror and shifts the position of said image to be projected on said photoreceptor drum by moving the reflecting mirror.

6. The microfilm reader/printer according to claim 4, wherein
    said shifting means has two parallel reflecting planes or refracting planes and rotates to shift the optical axis of said image, so as to shift the whole of said image in the direction orthogonal to the transporting direction of said recording medium.

7. An image recording apparatus comprising:
    image forming means for reproducing an image recorded on an original onto a recording medium;
    projecting means for projecting said image on said original onto said image forming means;
    detecting means for detecting what position on said image forming means said image is projected;
    shifting means for shifting an optical axis of said image to be projected in a direction orthogonal to a transporting direction of said recording medium; and
    controlling means responsive to the result of the detection by said detecting means for controlling said shifting means to operate so that said image may be formed at a predetermined position on said recording medium.

8. The image recording apparatus according to claim 7, wherein
    said shifting means has two parallel reflecting planes or refracting planes and rotates to shift the optical axis of said image, so as to shift the whole of said image in the direction orthogonal to said transporting direction of said recording medium.

9. The image recording apparatus according to claim 8, further comprising:
    transporting means for transporting said recording medium to said image forming means at a predetermined timing, wherein
    said controlling means changes a timing to transport said recording medium when said image deviates in said transporting direction of said recording medium when shifted in the direction orthogonal to said transporting direction by said shifting means.

10. The image recording apparatus according to claim 7, wherein
    said shifting means includes a reflecting member for reflecting projected light toward said image forming means and shifts said image by altering a position of the reflection.

11. The image recording apparatus according to claim 10, wherein
    said reflecting member is movably supported in a direction orthogonal to said projected light and moves to shift a position of said image to be projected.

12. A microfilm printer comprising:
image forming means for reproducing an image of a microfilm onto a recording medium;
transporting means for transporting said recording medium to said image forming means at a predetermined timing;
projecting means having a light source for projecting said image of said microfilm onto said image forming means;
shifting means having two parallel reflecting planes or refracting planes for shifting an optical axis of said image by rotation, so as to shift the whole of said image in a direction orthogonal to a transporting direction of said recording medium;
detecting means for detecting a position of said image to be projected onto said image forming means; and
controlling means responsive to the result of the detection by said detecting means for operating said shifting means to rotate said image so that said image may be formed at a predetermined position on said recording medium and for controlling said transporting means so that a timing to transport said recording medium may be altered.

13. The microfilm printer according to claim 12, further comprising:
image rotating means for rotating an image to be projected, wherein
said shifting means is located downstream of an optical path of projected light from said image rotating means.

14. A microfilm printer comprising:
image forming means for reproducing an image of a microfilm onto a recording medium;
transporting means for transporting said recording medium to said image forming means at a predetermined timing;
projecting means having a light source for projecting said image of said microfilm onto said image forming means;
projecting position correcting means held movably in a direction orthogonal to a transporting direction of said recording medium for reflecting projected light from said projecting means in a predetermined direction and also shifting an optical axis of the image while moving in said orthogonal direction, so as to shift the whole of said image in said orthogonal direction;
detecting means for detecting a position of said image to be projected onto said image forming means; and
controlling means responsive to the result of the detection by said detecting means for operating said projecting position correcting means to correct said image so that a predetermined position on said recording medium and for controlling said transporting means so that a timing to transport said recording medium may be altered.

15. The microfilm printer according to claim 14, further comprising:
image rotating means for rotating an image to be projected, wherein
said projecting position correcting means is located between said image rotating means and said image forming means.

16. An image forming method in an image recording apparatus for projecting an image recorded on an original to reproduce the projected image onto a recording medium, said method comprising the steps of:
detecting what position on said recording medium said image is reproduced;
evaluating a deviation of said image in a first direction and a deviation of said image in a second direction different from said first direction with respect to a predetermined position on said recording medium based on the result of said detection; and
shifting a position of said image to be projected so that said image on said original may be reproduced at a predetermined position on said recording medium.

17. The image forming method according to claim 16, further comprising the step of:
shifting a mirror upon shifting the position of said image to be projected in order to shift the position of said image in said first direction.

18. The image forming method according to claim 16, further comprising the step of:
rotating shifting means having two parallel reflecting planes or refracting planes upon shifting the position of said image to be projected in order to shift the position of said image in said first direction.

19. The image forming method according to claim 18, further comprising the step of:
altering a paper feeding timing in order to correct the deviation of said image in said second direction.

* * * * *